US012607158B2

(12) United States Patent
Bitler

(10) Patent No.: US 12,607,158 B2
(45) Date of Patent: Apr. 21, 2026

(54) CIRCULAR CHANNELED FORCED INDUCTION FUEL BOWL SYSTEM WITH FUEL SYPHONING TECHNOLOGY

(71) Applicant: Jonathan L Bitler, Weeki Wachee, FL (US)

(72) Inventor: Jonathan L Bitler, Weeki Wachee, FL (US)

( * ) Notice: Subject to any disclaimer, the term of this patent is extended or adjusted under 35 U.S.C. 154(b) by 0 days.

(21) Appl. No.: 18/491,758

(22) Filed: Oct. 21, 2023

(65) Prior Publication Data

US 2025/0129757 A1 Apr. 24, 2025

Related U.S. Application Data

(60) Provisional application No. 63/382,746, filed on Nov. 14, 2022.

(51) Int. Cl.
*F02M 19/06* (2006.01)

(52) U.S. Cl.
CPC .................................. *F02M 19/06* (2013.01)

(58) Field of Classification Search
CPC .............. F02M 5/02; F02M 5/14; F02M 5/12
USPC .................................................. 261/70, 23.2
See application file for complete search history.

(56) References Cited

U.S. PATENT DOCUMENTS 3,904,712 A 9/1975 Taylor
5,667,730 A * 9/1997 Barfield .................. F02M 1/16 261/DIG. 50
6,364,291 B1 * 4/2002 Grant ...................... F02M 5/14 261/70
9,062,629 B2 6/2015 Burns et al.
D771,145 S 11/2016 Laws
9,574,521 B2 * 2/2017 Krup .................... F02M 37/025
2001/0054773 A1 * 12/2001 Braswell .................. F02M 5/02 261/70
2003/0201553 A1 * 10/2003 Gangler ................... F02M 5/12 261/70
2015/0152813 A1 * 6/2015 Krup ...................... F02M 17/06 137/561 A
2016/0047336 A1 * 2/2016 Laws ....................... F02M 5/14 29/525.01

(Continued)

FOREIGN PATENT DOCUMENTS

JP S57159948 A 10/1982
NZ 512556 A * 12/2002 ............... F02M 5/02

*Primary Examiner* — J. T. Newton
(74) *Attorney, Agent, or Firm* — DP IP GROUP; Franco S. De Liguori

(57) ABSTRACT

A fuel bowl system for a carburetor has a fuel bowl with a cavity configured to receive and store liquid fuel prior to delivery to the carburetor. The fuel bowl has a main structure extending from an outer surface of the fuel bowl. The main structure has an inlet for receiving liquid fuel from a fuel source and discharge passages in fluid communication with the inlet and the cavity. A cap is removably connected to the main structure. The main structure and the cap together define fuel delivery channels in fluid communication with the inlet and the discharge passages. The inlet directs liquid fuel received from the fuel source into the fuel delivery channels, the fuel delivery channels deliver the liquid fuel into the discharge passages, and the discharge passages discharge the liquid fuel into the cavity of the fuel bowl.

20 Claims, 1 Drawing Sheet

(56) References Cited

U.S. PATENT DOCUMENTS

2016/0097347 A1* 4/2016 Kyle ........................ F02M 5/12
261/70

* cited by examiner

CIRCULAR CHANNELED FORCED INDUCTION FUEL BOWL SYSTEM WITH FUEL SYPHONING TECHNOLOGY

CROSS-REFERENCE TO RELATED APPLICATIONS

The application claims the benefit of U.S. Patent Provisional Application No. 63/382,746 filed Nov. 14, 2022.

FIELD OF THE INVENTION

The present invention is directed to a fuel bowl system for a carburetor, and to a method and design of supplying liquid fuel to a fuel bowl on a carburetor using the FST (fuel syphoning technology) method.

BACKGROUND OF THE INVENTION

Related Art

U.S. Pat. No. 9,574,521 issued to William R. Krup in 2017; Fuel bowl and method of feeding fuel U.S. Pat. No. 6,364,291 issued to Barry Grant in 2002; Carburetor fuel bowl having increased fuel carrying capacity Japan Patent No. JPS57159948A issued to Kunichika Usui in 1982; Carburetor device U.S. Pat. No. 9,062,629 issued to Michael P. Burns in 2015; Carburetor fuel system U.S Patent Application No. 2016/0047336 filed by James M. Laws and published in 2016; Fuel bowl for carburetor system and associated methods U.S. Pat. No. D771,145S1 issued to James M. Laws in 2016; Fuel Bowl U.S. Pat. No. 3,904,712 issued to Roland S. Taylor in 1975: Carburetor fuel bowl vent

Background Information

The carburetor design has been around since the 1800's. Carburetors were the common method of fuel delivery to a combustible engine until the late 1980's when fuel injection became the most used. Since then, there have been multiple variations of the carburetor and all of its counter parts. The carburetor has been used in many different types of applications to include, but not limited to: airplanes, street cars, motorcycles and boats and it continues to be popular in various forms of professional motorsports/powersports. The purpose of the carburetor is to mix air and fuel which allows for atomization of the air and fuel for better distribution into an internal combustion engine. How a carburetor works: A carburetor can be 1-4 venturi design it has a booster in the middle of the 1-4 venturi's which helps shear fuel upon vacuum from an internal combustion engine. It pulls fuel from a metering block or metering plate that is connected to the carburetor that when properly calibrated helps provide a proper mixture of air and fuel. The fuel is stored in a fuel bowl or fuel cavity that is connected to the metering block or plate and is fastened to the main body of the carburetor for a tight seal. Fuel is delivered from a fuel pump to the inlet of the fuel bowl or cavity and delivered into the bottom of a fuel bowl. The fuel level is maintained by a float to allow a flow valve or needle valve to control the volume of fuel that enters the fuel bowl. On a standard carburetor fuel bowl, aeration of fuel has been known to be a problem when higher fuel pressures are required for specific applications. This is due to an increased volume of fuel entering the bowl and a lack of channeling or diverters to direct the fuel appropriately and keep it from becoming turbulent, thus causing aeration of the fuel.

SUMMARY OF THE INVENTION

A method and design of supplying liquid fuel to a fuel bowl on a carburetor using the FST (fuel syphoning technology) method. The channeling in the fuel bowl allows for a pressure change to take place even though the fuel system is boost referenced with a fuel pressure regulator. Of the four fuel discharge passages, two of them discharge the fuel into the fuel bowl cavity at a 45-50 degree angle, and the remaining two release the fuel horizontally towards the fuel bowl cavity below the float. The pressure changes in the fuel bowl channels allow the fuel to be distributed into the fuel bowl cavity through the 4 passages with reduced aeration, further creating a syphoning effect which allows a reduction in fuel turbulence keeping the fuel in its liquid state. Keeping the fuel in a liquid state is important due to the need to allow the metering system of the carburetor to deliver a proper fuel curve to an internal combustion engine. Once pulled into the metering block or plate, the only air that is required to enter the main well of the metering block (not the fuel bowl or cavity) is from a channel at the top of the main body of the carburetor called the high-speed air channel. Proper calibrations in the J channel of the metering block creates the fuel curve and induces air into the main well channel in the metering block of the carburetor before reaching the top of the booster causing a shearing effect upon entry into the venturi. If the fuel were to aerate upon entry into the metering system through the two main well calibration jets it would change the calibration drastically and could cause catastrophic damage to the internal combustion engine due to the fact that additional unmetered air is added. While air is an important part of the calibration process of the carburetors desired fuel curve, the required air needs only enter the system through the venturis of the carburetor and the calibrated air bleeds located in the top of the carburetor main body, not through the fuel bowl inlet, channels, or cavity. One known deficiency of a fuel bowl is that during times of increased fuel demands, due to a rise in manifold atmospheric pressures from a compressor or turbo charger, pneumatic air pressure is sent to the top of a fuel pressure regulator to the inlet of the fuel bowl. The fuel entering the bowl becomes aerated due to the increased velocity in which it enters the needle valve at the top of the bowl. The agitated fuel becomes frothy due to aeration that is caused in part by a smaller cavity design fuel bowl and is not able to deliver the fuel to the metering block effectively due to the lack of area for fuel reserve and not having proper diverters to smooth the flow of fuel into the fuel cavity. What is needed is a design that allows the fuel to enter the fuel bowl via four channels positioned at various degrees/angles to deliver and discharge the fuel at a mid-point in the bowl. This creates less aeration of the fuel due to the fuel syphoning effect upon the entry into the bowl mid-level at a controlled state instead of the top. Another known deficiency when using a carburetor on a high horsepower engine that is forced induction in the fuel cavity has less fuel reserve due to the smaller size of the fuel bowl itself. What is needed is a design that has a fuel reserve cavity that is larger in size so there is more fuel available upon demand for a high horsepower application.

The present invention provides an improved large capacity fuel bowl designed to supply liquid fuel to a forced induction carburetor. The fuel system utilizes a single or dual float to control the fuel level from one or two needle valves which direct liquid fuel through two or four circular channels which flow into to four or eight mid-level entry points depending on the configuration, which are angled at various degrees. The angled entry points inside the fuel cavity create a fuel syphoning effect, keeping the fuel stable and not allowing it to aerate under various pressures which increases pounds an hour of fuel flow into the fuel cavity. The springless float is hinged to the main structure in the fuel bowl system so it can pivot/oscillate efficiently, controlling fuel levels without restriction to effectively deliver more or less fuel depending on changes in manifold atmospheric pressures.

A fuel bowl system for a carburetor includes: a fuel chamber or cavity that stores fuel prior to consumption for use by the carburetor; a needle valve that delivers fuel to circular channels which feed four inlets into the fuel chamber per quadrant; one or two caps attached to the outer fuel bowl system to seal and allow a fuel line inlet to supply fuel to the needle valve; and a hinged float used to monitor the fuel level to open and close the needle valve per fuel consumption needs.

The fuel bowl system circular channels feeding the four discharge points into the fuel cavity create a pressure differential which creates fuel syphoning upon fuel entering the fuel bowl cavity.

The syphoned fuel is stabilized upon high atmospheric pressure changes eliminating aeration of the liquid fuel.

There is one needle valve per venturi (priority feed per quadrant) of a carburetor to maximize fuel delivery for consumption.

There is an end cap design that ensures a tight seal to form the circular channels which feed the four inlets per quadrant, unlike other designs that use inserts or additional pieces.

The fuel bowl system eliminates the requirement for float spring needed for fuel control and hinges directly to the fuel bowl system eliminating any need for additional hardware.

A wide radius circular channeling is used for increased pounds per hour of liquid fuel flow (no restriction).

BRIEF DESCRIPTION OF DRAWINGS

The following drawings refer to the embodiments of the present invention. It should be understood that the description of the drawings are provided purely for the purpose of illustration and exemplification only and are in no way to be taken as limitative of the scope of the present invention.

DETAILED DESCRIPTION OF THE INVENTION

Figure 1:
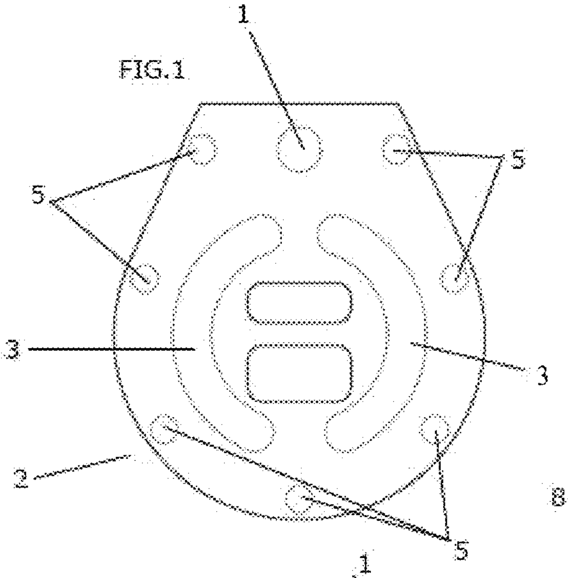
FIG. 1 is a view of the inside cap fuel channeling system cover which attaches to FIG. 3 to form the circular channel reservoir.
Figure 2:
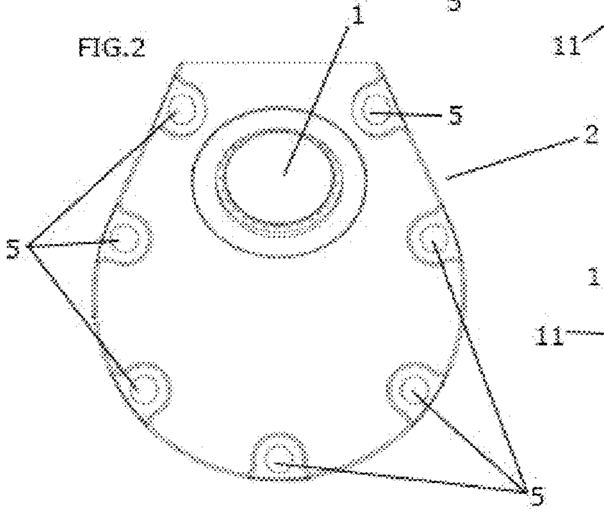
FIG. 2 is an outside view of FIG. 1 and is an embodiment of the end cap that attaches to the outside of the fuel bowl system which seals the unit to FIG. 3.
Figure 3:
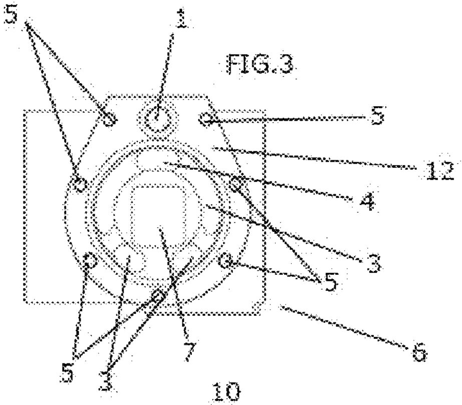
FIG. 3 is a side view of the fuel bowl system before the caps in FIGS. 1 and 2 are attached, showing a view of the fuel channels which create fuel syphoning.
Figure 4:
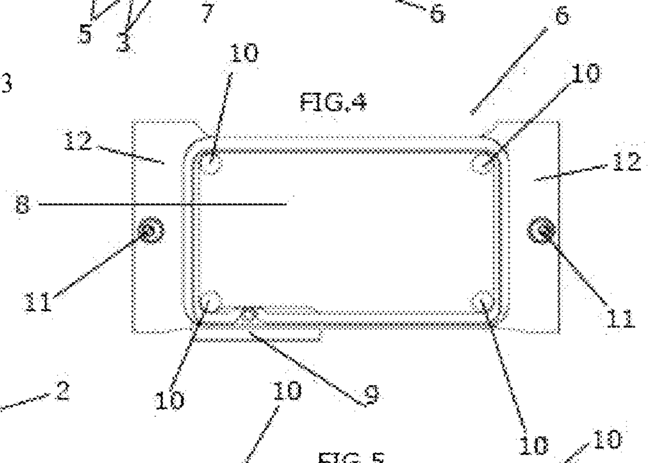
FIG. 4 is an inside view of the fuel bowl showing the large internal fuel cavity and shows ans embodiment that exemplifies a dual needle valve configuration.
Figure 5:
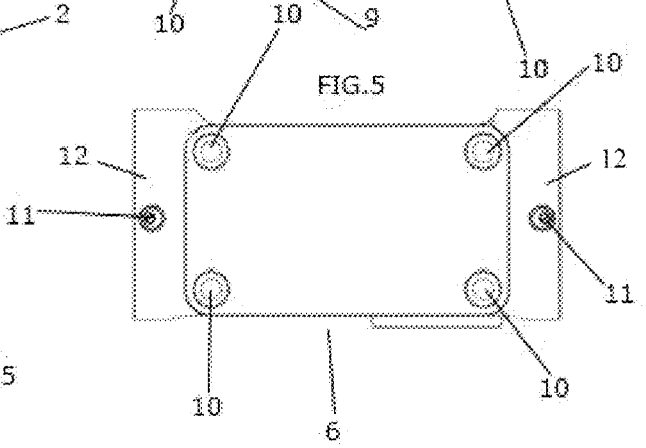
FIG. 5 is the outside view of FIG. 4 without the caps in FIG. 1 and FIG. 2 attached to its ends.

The quad or dual circular channel (3) forced induction fuel bowl with fuel syphoning technology utilizes channels (3) to deliver fuel to the fuel bowl system to allow a carburetor to have the proper fuel capacity in a forced induction or naturally aspirated scenario. The fuel bowl system can be in two forms; one being a single needle valve or, two, being a dual needle valve configuration. For a single configuration the needle valve and fuel channeling system is provided on a main structure (12) located on the back side of the fuel bowl (6) having a cavity (8) and uses one float to control the fuel level; only one inlet (1) as its fuel source is used in this configuration. In a dual configuration there will be one needle valve and fuel channeling system (3) provided on main structures (12) located on opposing sides or ends of the fuel bowl (6) having the cavity (8), with independent floats for fuel level control that increases fuel flow capacity. The mid feed discharge (4) allows unaerated fuel to be delivered to the circular channeling (3). When in a forced induction state, the fuel bowl systems responsibility is to maintain the proper fuel level while allowing a 1:1 pressure ratio increase. The fuel and manifold atmospheric pressure increases while the engine is consuming the fuel and maintaining the proper level upon atmospheric pressure changes in the internal combustion engine. This pressure can range from 0-150 psi. The fuel bowl system consists of the fuel bowl (6) with a large capacity fuel cavity (8) and main structure (12) with circular fuel delivery channels (3) that are completed by the outer caps (2) (FIGS. 1 & 2) that are attached by seven screws (5) and sealed by two O-rings per side. Each outer cap 2 includes a straight inlet (1) to reduce fuel drag and is where the fuel line is attached. One or two needle valves direct fuel in the circular channels (3) and allow the channels to distribute the liquid fuel into the fuel bowl cavity (8). When fuel is forced through these circular channels (3) it creates a pressure differential directing fuel into the four or eight fuel distribution outlets where they merge together creating a syphoning effect as the liquid fuel enters the cavity (8). When the fuel is distributed in this manner, as per the needs of the internal combustion engine and manifold atmospheric pressure demands the fuel level is properly maintained by the float which is attached using the float housing (7) allowing the maximum amount of fuel in the fuel bowl cavity (8) to be on reserve for the internal combustion engine demands. This effect allows the fuel channels (3) to fill with fuel, priming the system for immediate fuel consumption upon atmospheric pressure referencing to the engine and the fuel pressure regulator. The syphoning effect upon entry to the fuel cavity (8) reduces aeration and stabilizes the fuel with its nonrestrictive channels (3) and wide sweeping radiuses to a merge point into the fuel bowl cavity (8) which is important through the major increase of pressures and pressure change. This method is important because when one channel of fuel is larger than another and at a merge point in the fuel bowl cavity (8) it will create a syphon effect pulling more fuel from the overall channeling (3) thus an increase of pounds per hour of fuel flow and not allowing aeration into the fuel cavity (8). If fuel is mixed with air bubbles it will change the calibration of the carburetor upon fuel delivery to the engine because there will be un metered air going into the main well of the metering block or plate. This present design prohibits that from ever happening. The construction of the fuel bowl system (FIGS. 4&5) utilizes four ¼ holes (10) to allow the fuel bowl bolts to protrude through the fuel bowl cavity (8) and the metering block or plate to allow the fuel bowl system to fasten to the carburetor main body. As part of the fuel bowl system the float attachment hinge (7) is integrated within the fuel bowl system and requires only a 1.5 inch pin to attach the float to the fuel bowl system. The float hinge pin is installed by using the ⅛ inch hole (11) to insert the pin into the float keeping the float suspended for proper level operation and utilizes a 1/16 NPT plug to ensure it doesn't leak any fuel while under pressure during normal operation. The fuel bowl system also has a diaphragm housing (9) integrated in the bottom of the fuel bowl (6). It is designed to store unaerated fuel for proper carburetor function while opening the throttle blades. This cavity will direct unmetered and unaerated fuel into the main body of the carburetor allowing the internal combustion engine to accelerate upon throttle positioning without going lean (or lack of fuel causing a stumble and poor operation).

The invention claimed is:

1. A fuel bowl system for a carburetor, the fuel bowl system comprising:

a fuel bowl having a cavity configured to receive and store liquid fuel prior to delivery to the carburetor, the fuel bowl including a main structure extending from an outer surface of the fuel bowl, the main structure having an inlet for receiving liquid fuel from a fuel source and discharge passages in fluid communication with the inlet and the cavity; and a cap removably connected to the main structure, the main structure and the cap together defining fuel delivery channels in fluid communication with the inlet and the discharge passages, wherein the inlet directs liquid fuel received from the fuel source into the fuel delivery channels, the fuel delivery channels deliver the liquid fuel into the discharge passages, and the discharge passages discharge the liquid fuel into the cavity of the fuel bowl.

2. The fuel bowl system of claim 1, wherein the discharge passages are configured to deliver and discharge the fuel into the fuel bowl cavity at a mid-level location within the fuel bowl, thereby reducing aeration of the fuel by creating a syphoning effect upon entry at the mid-level location.

3. The fuel bowl system of claim 1, wherein the discharge passages comprise two discharge passages for discharging the fuel into the fuel bowl cavity at a 45-50 degree angle, and two discharge passages for discharging the fuel horizontally towards the fuel bowl cavity.

4. The fuel bowl system of claim 1, wherein the discharge passages and the fuel delivery channels are configured to create a pressure differential that induces a syphoning effect to reduce aeration and promote fuel stabilization within the fuel bowl cavity.

5. The fuel bowl system of claim 1, wherein the fuel bowl cavity has an internal volume configured to provide additional fuel reserve for high-horsepower or forced-induction applications.

6. The fuel bowl system of claim 1, further comprising a diaphragm housing integrated into a lower portion of the fuel bowl cavity, the diaphragm housing being configured to direct unaerated fuel to the carburetor.

7. The fuel bowl system of claim 1, wherein the fuel bowl system includes holes configured to receive bolts that protrude through the fuel bowl cavity for fastening the fuel bowl system to a main body of the carburetor.

8. The fuel bowl system of claim 1, wherein the main structure and the cap are provided on an outer side surface of the fuel bowl.

9. The fuel bowl system of claim 1, wherein the fuel delivery channels comprise circular channels formed by two open channels on the main structure cooperating with two corresponding open channels on the cap.

10. The fuel bowl system of claim 1, wherein the inlet of the main structure is configured to direct the liquid fuel received from the fuel source to a needle valve that cooperates with a float to maintain a fuel level within the fuel bowl cavity.

11. A fuel bowl system for a carburetor, the fuel bowl system comprising:

a fuel bowl having a cavity configured to receive and store liquid fuel prior to delivery to the carburetor;

two main structures, each extending from a respective opposite outer surface of the fuel bowl, each main structure having an inlet for receiving liquid fuel from a fuel source and discharge passages in fluid communication with the inlet and the cavity; and two caps, each removably connected to a corresponding one of the two main structures, wherein each main structure and its corresponding cap together define fuel delivery channels in fluid communication with the inlet and the discharge passages of that main structure;

wherein for each main structure and corresponding cap, the inlet directs liquid fuel received from the fuel source into the fuel delivery channels, the fuel delivery channels deliver the liquid fuel into the discharge passages, and the discharge passages discharge the liquid fuel into the cavity of the fuel bowl.

12. The fuel bowl system of claim 11, wherein for each main structure and corresponding cap, the discharge passages are configured to deliver and discharge the fuel into the fuel bowl cavity at a mid-level location within the fuel bowl, thereby reducing aeration of the fuel by creating a syphoning effect upon entry at the mid-level location.

13. The fuel bowl system of claim 11, wherein for each main structure and corresponding cap, the discharge passages comprise two discharge passages for discharging the fuel into the cavity at a 45-50 degree angle, and two discharge passages for discharging the fuel horizontally towards the fuel bowl cavity.

14. The fuel bowl system of claim 11, wherein for each main structure and corresponding cap, the discharge passages and the fuel delivery channels are configured to create a pressure differential that induces a syphoning effect to reduce aeration and promote fuel stabilization within the fuel bowl cavity.

15. The fuel bowl system of claim 11, wherein the fuel bowl cavity has an increased internal volume relative to standard carburetor fuel bowls to provide additional fuel reserve for high-horsepower or forced-induction applications.

16. The fuel bowl system of claim 11, further comprising a diaphragm housing integrated into a lower portion of the fuel bowl cavity, the diaphragm housing being configured to direct unaerated fuel to the carburetor.

17. The fuel bowl system of claim 11, wherein the fuel bowl system includes a plurality of holes configured to receive bolts that protrude through the fuel bowl cavity for fastening the fuel bowl system to a main body of the carburetor.

18. The fuel bowl system of claim 11, wherein the two main structures and corresponding caps extending from respective opposite side outer surfaces of the fuel bowl.

19. The fuel bowl system of claim 11, wherein for each main structure and corresponding cap, the fuel delivery channels comprise circular channels formed by two open channels on the main structure cooperating with two corresponding open channels on the cap.

20. The fuel bowl system of claim 11, wherein for each main structure and corresponding cap, the inlet of the main structure is configured to direct the liquid fuel received from the fuel source to a needle valve that cooperates with a float to maintain a fuel level within the fuel bowl cavity.

* * * * *